US012754408B2

(12) United States Patent
Huang et al.

(10) Patent No.: US 12,754,408 B2
(45) Date of Patent: Oct. 6, 2026

(54) IMAGING SYSTEM AND IMAGING METHOD

(71) Applicant: INNOLUX CORPORATION, Miao-Li County (TW)

(72) Inventors: Chong-Lin Huang, Miao-Li County (TW); Jia-Hong Su, Miao-Li County (TW); Pai-Chien Chou, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 343 days.

(21) Appl. No.: 18/491,408

(22) Filed: Oct. 20, 2023

(65) Prior Publication Data

US 2024/0168271 A1 May 23, 2024

(30) Foreign Application Priority Data

Nov. 22, 2022 (CN) ........................ 202211466467.6

(51) Int. Cl.
*G02B 21/26* (2006.01)
*G02B 21/34* (2006.01)
*G02B 21/36* (2006.01)

(52) U.S. Cl.
CPC ............. *G02B 21/26* (2013.01); *G02B 21/34* (2013.01); *G02B 21/361* (2013.01)

(58) Field of Classification Search
CPC ...... G02B 21/26; G02B 21/34; G02B 21/361; G02B 21/367; G02B 21/365; G01N 21/01; G01N 21/84
See application file for complete search history.

(56) References Cited

U.S. PATENT DOCUMENTS 7,813,638 B2 * 10/2010 Watkins ............ H01L 21/67288 348/126
9,066,000 B2 * 6/2015 Kuo ..................... H04N 13/239
9,176,152 B2 11/2015 Knutson et al.
9,690,088 B2 * 6/2017 Karube ................ G02B 21/082
11,307,399 B2 4/2022 Takahashi et al.
2010/0025567 A1 * 2/2010 Lueerssen ............ G02B 21/245 359/383
2013/0162782 A1 * 6/2013 Kuo ........................ G06T 7/593 348/47
2013/0274119 A1 * 10/2013 Knutson ............ G01N 15/1433 506/9
2014/0267673 A1 * 9/2014 Yamamoto ............... G02B 7/34 348/79
2018/0106992 A1 * 4/2018 Nakatsuka ........... G02B 21/367
2020/0131556 A1 * 4/2020 Zhang .............. G01N 33/54333

FOREIGN PATENT DOCUMENTS

TW M535319 U 1/2017
WO 03073365 A1 9/2003

* cited by examiner

*Primary Examiner* — Mustak Choudhury
(74) *Attorney, Agent, or Firm* — JCIPRNET

(57) ABSTRACT

An imaging system and an imaging method are provided for photographing samples in a non-complete plane arrangement. With using the imaging system and the imaging method, a clear image of each point of the sample can be obtained under a high-magnification microscope lens, and the steps of fixing and embedding the sample in advance can be simplified.

18 Claims, 4 Drawing Sheets

IMAGING SYSTEM AND IMAGING METHOD

CROSS REFERENCE TO RELATED APPLICATIONS

This Non-provisional application claims priority under 35 U.S.C. § 119(a) on Patent Application No(s). 202211466467.6 filed in People's Republic of China on Nov. 22, 2022, the entire contents of which are hereby incorporated by reference.

BACKGROUND

Technology Field

This disclosure relates to an imaging system and an imaging method, which can be used to photograph samples in a non-complete plane arrangement.

Description of Related Art

Conventional imaging systems use a high-magnification microscope lens to photograph samples so that subtle features can be easily found for feature analysis. However, the higher the magnification, the smaller the depth of field of the microscope lens. When the surface of the sample includes vertical gaps exceeding the range of the depth of field of the lens, some areas of the image captured through this lens will be blurred, and it is difficult to observe or photograph the sample clearly in one image.

Generally, the sample must be fixed in formalin and/or embedded in paraffin and then be sliced for proceeding the photographing step to obtain a clear image of the sample. However, the preparation process thereof is complicated and time-consuming, which is not conducive to rapid and large-scale sample observation.

Therefore, it is desired to provide an imaging system and method that can obtain large-scale clear sample images rapidly.

SUMMARY

This disclosure provides an imaging system, which includes a carrier stage for carrying an object to be sampled, an imaging unit disposed with respect to the carrier stage, and a first controller electrically connected to the imaging unit for controlling the imaging unit to move a first distance multiple times in a first direction, which is perpendicular to the carrier stage. The imaging unit photographs the object after each moving with the first distance, thereby obtaining a plurality of sample images.

This disclosure also provides an imaging method, which is applied to an imaging system for photographing an object to be sampled. The imaging method includes the following steps of: providing the above-mentioned imaging system; fixing the object on the carrier stage; moving the carrier stage to a first photographing position; moving the imaging unit a first distance multiple times in a first direction; and the imaging unit photographing the object after each moving with the first distance, thereby obtaining a plurality of sample images.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which:

FIGS. 5A and 5B show two defective cells located at different height positions in the liquid sample, wherein FIG. 5A is a top view, FIG. 5B is a side view, and the lateral dashed lines shown in FIG. 5B represent the heights A to E to be photographed by the second lens.

DETAILED DESCRIPTION OF THE DISCLOSURE

Figure 1:
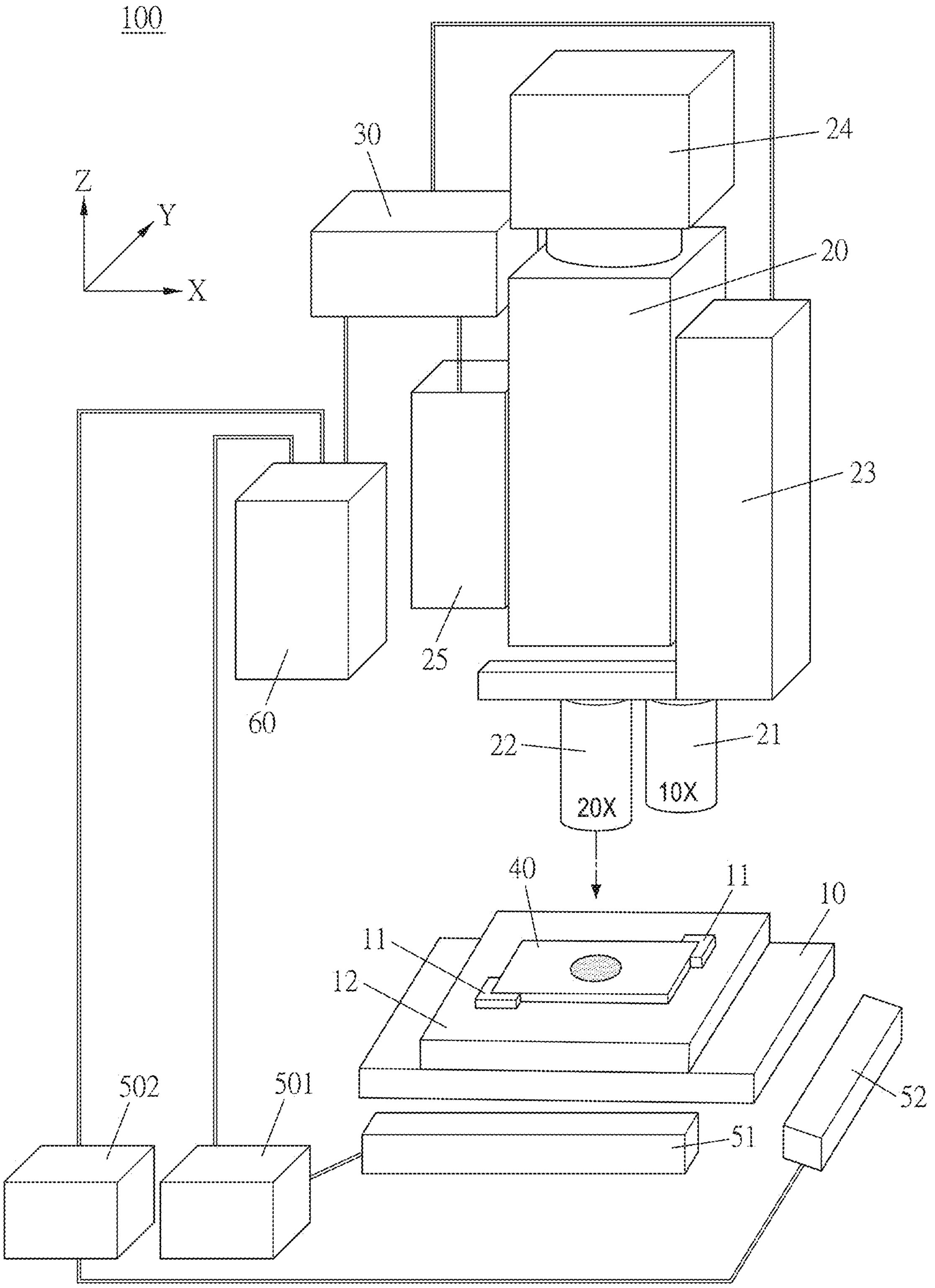
FIG. 1 is a schematic diagram showing an imaging system of this disclosure.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

Definitions

As used herein, each of the following terms has the meaning associated with it in this section. Unless defined otherwise, all technical and scientific terms used herein generally have the same meaning as commonly understood by one of ordinary skill in the art to which this disclosure belongs. Generally, the nomenclature used herein and the laboratory procedures in pathology, cytology and optics are those well-known and commonly employed in the art. It should be understood that the order of steps or order for performing certain actions is immaterial, so long as the present teachings remain operable. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

For purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Unless defined otherwise, all technical and scientific terms used herein have the same meaning as commonly understood by one having ordinary skill in the art to which the disclosure pertains. Moreover, as used in this specification and the appended claims, the singular forms "a", "an" and "the" include plural referents unless the content clearly dictates otherwise.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that, wherever values and ranges are provided herein, the description in range format is merely for convenience and brevity and should not be construed as an inflexible limitation on the scope of the invention. Accordingly, all values and ranges encompassed by these values and ranges are meant to be encompassed within the scope of the present invention. Moreover, all values that fall within these ranges, as well as the upper or lower limits of a range of values, are also contemplated by the present application. The description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. This applies regardless of the breadth of the range.

In addition, when an element/film is referred to as being on or over an additional element/film, or as being connected to an additional element/film, it should be understood that said element/film is directly located on the additional element/film, or is directly connected to the additional element/film, or there may be another element/film disposed therebetween (indirectly). Conversely, when an element/film is referred to as being "directly on" or "directly connected to" an additional element/film, it should be understood that there is no interlayer arranged therebetween. In addition, the terms "electrically connected" or "coupled" include any direct and indirect means of electrical connection.

The type of the object to be sampled that can be used in the imaging system and/or imaging method of the present disclosure is not particularly limited. For example, it can be a solid or liquid sample of tissues or cells, such as a blood sample, an interstitial fluid sample or a cell culture sample. In addition, the object to be sampled used in the imaging system and/or imaging method of the present disclosure can be unprocessed fresh tissue or cell samples, or tissue or cell samples that have been formalin-fixed and/or paraffin-embedded in advance.

Unless otherwise defined, all terms (including technical and scientific terms) used herein have the same meaning as commonly understood by one of ordinary skill in the art to which this disclosure belongs. It can be understood that these terms, such as those defined in commonly used dictionaries, should be interpreted as having a meaning consistent with the background or context of the related technology and the present disclosure, and should not be interpreted in an idealized or overly formal manner, unless otherwise specified in the disclosed embodiments.

Imaging System

The present disclosure provides an imaging system, specifically an imaging system for photographing a sample. In one embodiment, the present disclosure provides an imaging system for photographing defective cells in a non-complete plane arrangement. The "defective cells" refer to over-differentiated or poorly differentiated cells that are different from normal cells, such as cancer cells, incompletely differentiated cells, etc. The "non-complete plane arrangement" means, for example, that two or more cells to be observed are not located on the same plane. For example, in a liquid blood sample, two or more blood cells are located at positions of different heights in the sample.

As used in this disclosure, the terms "imaging" and "photographing" have the same meaning and can be used interchangeably, wherein these terms refer to capturing a part or all of an image or picture of an observed position in an object to be sampled.

The imaging system of this disclosure at least includes a carrier stage, an imaging unit and a first controller, wherein the carrier stage can be used to carry an object to be sampled, such as a glass slide carrying a sample. The imaging unit is arranged relative to the carrier stage and includes multiple lenses, which may have different magnifications and/or different functions. The first controller is used to control the imaging unit to move a first distance multiple times in a first direction perpendicular to the carrier stage. For example, the imaging unit can further include a first driving unit electrically connected to the first controller. In this case, the first controller can control the first driving unit so as to move the imaging unit the first distance multiple times in the first direction. After each moving with the first distance in the first direction, the object is photographed with different focal lengths so as to obtain multiple images.

In one embodiment, the imaging system further includes a distance measuring unit, which is electrically connected to the first controller and is configured for measuring a distance between the imaging unit and the carrier stage. In another embodiment, the distance measuring unit can be a laser focusing device.

In one embodiment, the imaging system further includes a lighting unit arranged on the carrier stage. In another embodiment, the imaging system further includes a transparent layer arranged on the lighting unit. The light emitted from the lighting unit can pass through the transparent layer, and the transparent layer can carry the object to be sampled. In this case, the transparent layer can reduce the damage caused by the glass slide to the surface of the lighting unit when loading and/or removing the object. The material of the transparent layer may, for example, include polyimide (PI), polycarbonate (PC), polyethylene terephthalate (PET), polymethyl methacrylate (PMMA), rubber, ABS resin (acrylonitrile butadiene styrene), glass, any of other suitable materials, or any combination of the above materials. In another embodiment, the lighting unit can provide light sources of different intensities or different wavelengths according to requirements or according to the magnification or type of the lens of the imaging unit.

In one embodiment, the imaging system of the present disclosure further includes a second controller, which can be used to control the carrier stage to move a second distance and/or a third distance multiple times in a second direction and/or a third direction parallel to the carrier stage, wherein the first direction, the second direction and the third direction are different from each other. For example, the first direction, the second direction and the third direction are perpendicular to each other. In another embodiment, a second driving unit, which is electrically connected to the second controller, can be used to control the carrier stage to move a second distance multiple times in a second direction parallel to the carrier stage. In another embodiment, a third driving unit, which is electrically connected to the second controller, can be used to control the carrier stage to move a third distance multiple times in a third direction parallel to the carrier stage. After moving the second distance multiple times in the second direction and moving the third distance multiple times in the third direction, the object to be sampled can be divided into multiple regions for performing the photographing step, thereby obtaining multiple sample images. In another embodiment, the imaging system of the present disclosure further includes a second controller and a third controller, and the first controller, the second controller and the third controller can be electrically connected to a first driving unit, a second driving unit and a third driving unit, respectively, so that the carrier stage can move one or more times of the first distance in the first direction, one or more times of the second distance in the second direction, and one or more times of the third distance in the third direction. In one embodiment, the first driving unit, the second driving unit and the third driving unit may be linear motors, but the disclosure is not limited thereto.

In one embodiment, the imaging system of the present disclosure further includes a processing unit, which can be used to receive the multiple of sample images obtained by the imaging unit and integrate them into one fusion image data. In another embodiment, the processing unit can be further electrically connected to the first controller, the second controller and/or the third controller. That is, the processing unit can control the first controller, the second controller and/or the third controller by regular or specific programming to achieve automatic photographing and integrating sampled images. In another embodiment, the processing unit can be a processor, but this disclosure is not limited thereto.

Imaging Method

This disclosure provides an imaging method, particularly an imaging method for photographing samples in a non-complete plane arrangement. The imaging method includes the following steps of: providing the above-mentioned imaging system; fixing an object to be sampled on a carrier stage; moving the carrier stage to a first photographing position of the object; moving the imaging unit a first distance multiple times in a first direction, wherein the first direction is perpendicular to the carrier stage; and the imaging unit photographing the object after each moving with the first distance, thereby obtaining a plurality of sample images.

In one embodiment, the imaging method of this disclosure further includes a step of: providing a distance measuring unit for measuring a distance between the imaging unit and the carrier stage. In another embodiment, the distance measuring unit can measure the lowest photographing position and the highest photographing position of the samples in the object, which are used to determine the number of subsequently moving the first distance. In one embodiment, the sample can be a cell sample, a tissue sample or a mixture thereof. In one embodiment, the cells and/or tissues can be normal cells or tissues, or they can be cancer cells, incompletely differentiated cells, or cancerous tissues. For example, in a blood sample, the lowest photographing positon can be located at the upper surface of the microscope slide or the position of the lowest blood cell in the observed blood sample (i.e., the sample closest to the upper surface of the microscope slide), and the highest photographing position can be the bottom surface of the coverslip or the position of the highest blood cell in the observed blood sample (i.e., the sample farthest from the upper surface of the microscope slide).

In one embodiment, the imaging method of this disclosure further includes a step of: measuring the lowest photographing position and the highest photographing position in the object to be sampled, and determining the number of moving with the first distance based on the difference between the lowest photographing position and the highest photographing position. In another embodiment, the imaging unit is moved with the first distance for 2-7 times. In another embodiment, the imaging unit is moved with the first distance for 3-5 times. In one embodiment, the first distance is from about 1 m to about 5 km. In another embodiment, the first distance is about 3 km.

In one embodiment, the imaging method of the disclosure further comprises a step of: determines the length of the first distance in advance. For example, the first distance can be from about 1 m to about 5 km. In another embodiment, the first distance can be about 3 km. In another embodiment, the imaging unit can be moved with the first distance multiple times and photograph the sample after each moving. For example, the imaging unit can be moved and photograph 2 to 7 times. In another embodiment, the imaging unit can be moved and photograph 3 to 5 times, and this disclosure is not limited thereto.

In one embodiment, before the step of moving the carrier stage to the first photographing position, the imaging method of this disclosure further includes a step of: moving the carrier stage to a preview position, and the imaging unit photographing the object to obtain a preview image. In another embodiment, the imaging method further includes steps of: providing a processing unit; and the processing unit receiving the preview image and determining the first photographing position. In this case, the processing unit compares the preview image with a built-in database to determine the first photographing position based on the samples matching the specific feature or the aggregation density of the samples. For example, the first photographing position can be determined according to the morphology of the tissues or cells or the aggregation degree of the cells. In another embodiment, the first photographing position is selected from the location where abnormal cells appear or where they gather.

In one embodiment, the imaging unit obtains the preview image with a first magnification and obtains the plurality of sample images with a second magnification, and the first magnification is not equal to the second magnification. In another embodiment, the first magnification is less than the second magnification. In another embodiment, the preview image is a whole-area image of the object or a partial-area image of the object. In another embodiment, the preview image contains a range of the object greater than a range of the object contained in the sample image.

As shown in FIG. 1, the imaging system 100 of this disclosure may include, for example but not limited to, a carrier stage 10, an imaging unit 20 and a first controller 30. The carrier stage 10 can be used to carry a microscope slide 40 containing an object to be sampled or a sample. The microscope slide 40 can be fixed on the carrier stage 10 through the positioning mechanism 11. The imaging system 100 may include a lighting unit 12 disposed on the carrier stage 10 for providing a light source for assisting the imaging unit 20 to obtain the sample images. The imaging unit 20 is arranged with respect to the carrier stage 10, and may be configured with a first lens 21 and a second lens 22. The magnification of the first lens 21 is different from that of the second lens 22. For example, the magnification of the first lens 21 can be less than the magnification of the second lens 22. The imaging system 100 can include a first driving unit 23, which is electrically connected to the first controller 30 for controlling the imaging unit 20 to move in a direction perpendicular to the carrier stage 10 (the normal direction of the carrier stage 10, i.e., the direction Z). In addition, the imaging system 100 may further include a distance measuring unit 25, which may be electrically connected to the first controller 30 and may cooperate with the first driving unit 23 to adjust the distance between the imaging unit 20 and the carrier stage 10. A second controller 501 is electrically connected to the second driving unit 51 for controlling the carrier stage 10 to move in a direction parallel to the carrier stage 10 (i.e., the direction X). A third controller 502 is electrically connected to the third driving unit 52 for controlling the carrier stage 10 to move in another direction parallel to the carrier stage 10 (i.e., the direction Y). The imaging unit 20 may include a camera module 24, which may include, for example, a charge coupled device (CCD) for capturing images and converting them into digital signals. The first controller 30, the second controller 501 and the third controller 502 can be electrically connected to the processing unit 60 and receive control signals from the processing unit 60. In addition, the second controller 501 and the third controller 502 can be integrated in a single controller and electrically connected to the processing unit 60 for receiving control signals from the processing unit 60 so as to simultaneously or separately control the second driving unit 51 and the third drive unit 52.

The operation of the imaging unit 20 will be further described with reference to FIG. 1 and FIG. 3. First, the sample SP is arranged on the microscope slide 40, and the number of photographing within the imaging range CR covering the sample SP is set. For example, the number of photographing is set to N times in the direction Y, and the number of photographing is set to M times in the direction X, that is N*M imaging spots are set within the imaging range CR. The photographing steps are as follows:

Step 1: setting a photographing original point O, which is distant from the left side of the microscope slide 40 by a distance Dx and distant from the bottom side of the microscope slide 40 by a distance Dy, moving the carrier stage 10 so as to make the photographing window of the camera module 24 of the imaging unit 20 cooperating with the first lens 21 substantially aligning the area 1, and photographing the area 1.

Step 2: after the imaging unit 20 photographing the area 1, moving the carrier stage 10 a preset distance in the direction Y so as to make the photographing window of the camera module 24 relatively move from the area 1 to the area 2, and photographing the area 2. By repeating this step 2, the photographing window of the camera module 24 can be moved stepwise and the camera module 24 can photograph for multiple times until reaching the area N.

Step 3: After reaching the area N, moving the carrier stage 10 a preset distance in the direction X so as to make the photographing window of the camera module 24 relatively move from the area N to the area N+1, and photographing the area N+1.

Step 4: similar to step 2, moving the carrier stage 10 downwardly along the direction Y. Accordingly, the photographing window of the camera module 24 can be moved stepwise and the camera module 24 can photograph for multiple times until reaching the area 2N.

Step 5: similar to step 3, moving the carrier stage 10 a preset distance in the direction X so as to make the photographing window of the camera module 24 relatively move away from the area 2N to the area 2N+1, and photographing the area 2N+1.

Step 6: similar to step 2, moving the carrier stage 10 in the direction Y. Accordingly, the photographing window of the camera module 24 can be moved stepwise and the camera module 24 can photograph for multiple times until reaching the area 3N.

Step 7: repeating the above steps until finishing the photographing steps of all areas M*N.

Figure 2A:
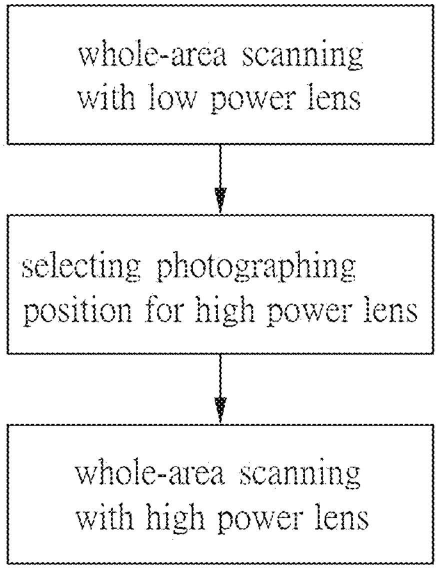
FIG. 2A is a flow chart of an imaging method according to an embodiment of this disclosure.
Figure 3:
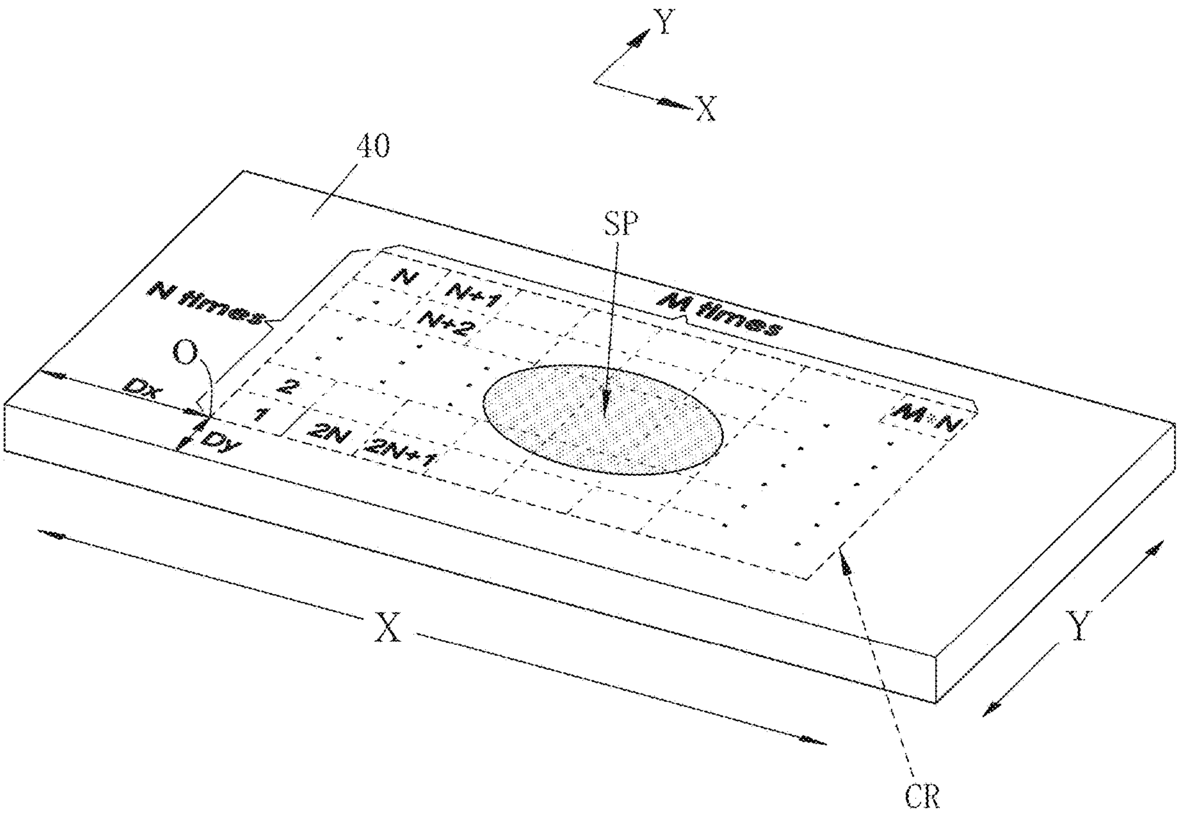
FIG. 3 is a schematic diagram showing the whole-area scan and the photographing positions in the imaging method of this disclosure.

Referring to FIG. 1, FIG. 2A and FIG. 3, the steps of the imaging process 1 are as follows:

Step 1: placing the sample on the microscope slide 40.

Step 2: after the positioning mechanism 11 fixing the microscope slide 40, moving the carrier stage 10 to the photographing origin point O.

Step 3: selecting the first lens 21, enabling the distance measuring unit 25 to assist the first lens 21 to focus (e.g. focus on the upper surface of the microscope slide 40), starting the photographing steps (based on the above-mentioned photographing steps) for performing the whole-area scan of the imaging range CR, and analyzing the sample images obtained by the above photographing steps to select the positions to be further photographed by the second lens 22. In the analyzing step, for example, the processing unit 60 calculates the sharpness of the sample images to determine whether there is any relatively clear area or to determine whether there is any area or position containing more cells or defective cells. For example, if the analyzing step totally selects n positions (e.g. positions a-n), the second driving unit 51 and the third driving unit 52 are activated to move the imaging unit 20 to align the first position (i.e. position a) while switching to the second lens 22, wherein the distance measuring unit 25 can be used to assist the focusing of the second lens 22.

Step 4: taking the upper surface of the microscope slide 40 as a reference point at the position a, setting a unit movement distance (i.e., a first distance) and/or the number of movements along the direction Z according to the parameters, and the first driving unit 23 moving the image unit 20 aligning the position a stepwisely (i.e., the image unit 20 is moved one unit (a first distance) in each movement), thereby performing the photographing steps at different altitudes in the direction Z.

Step 5: after finishing the photographing steps at the position a, activating the distance measuring unit 25, moving the imaging unit 20 to a second position (i.e. position b), and repeating the step 4 to perform the photographing steps. Repeating the above steps until reaching the position n.

Figure 2B:
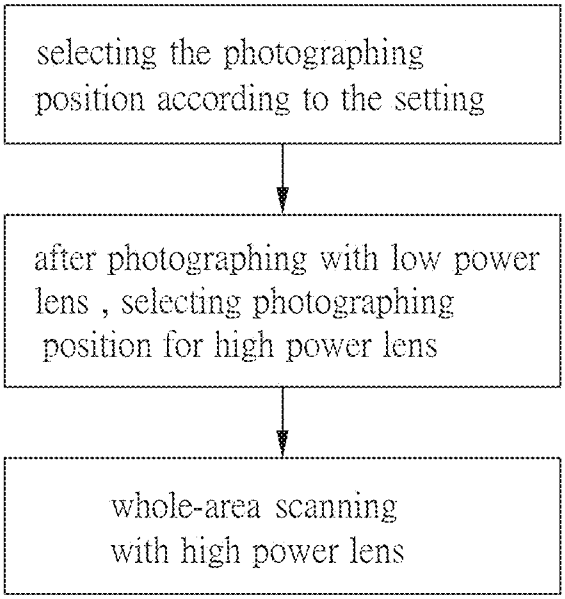
FIG. 2B is a flow chart of another imaging method according to the embodiment of this disclosure.

Referring to FIG. 1, FIG. 2B and FIG. 3, the steps of the imaging process 2 are as follows:

Step 1: placing the sample on the microscope slide 40.

Step 2: after the positioning mechanism 11 fixing the microscope slide 40, moving the carrier stage 10 to the photographing origin point O or toward the area within the central range of the microscope slide 40 according to the setting, and selecting an area for photographing based on the sample (as the center area shown in of FIG. 3), thereby reducing the photographing time.

Step 3: selecting the first lens 21, and enabling the distance measuring unit 25 to assist the first lens 21 to focus. The first controller 30 cooperated with the distance measuring unit 25 controls the first driving unit 23 to reach the focus position, the imaging unit 20 photographs to obtain a sample image, and then a position in the sample image to be further photographed by the second lens 22 is selected. For example, the processing unit 60 calculates the sharpness of the sample image to determine whether there is any relative clear area or to determine whether there is any area or position containing more cells or (suspected) defective cells. Then, the second driving unit 51 and the third driving unit 52 are activated to move the imaging unit 20 to align the selected position while switching to the second lens 22, wherein the distance measuring unit 25 can be used to assist the focusing of the second lens 22.

Step 4: taking the upper surface of the microscope slide 40 as a reference point at the selected position, setting a unit movement distance (i.e., a first distance) and/or the number of movements along the direction Z according to the parameters, and the first driving unit 23 moving the image unit 20 aligning this position stepwisely (i.e., the image unit 20 is moved one unit (a first distance) in each movement), thereby performing the photographing steps at different altitudes in the direction Z.

Step 5: after finishing the photographing steps at this position, moving the imaging unit 20 to the next area based on the setting of parameters, and repeating the above steps 3 and 4 until all positions have been photographed.

Figure 4:
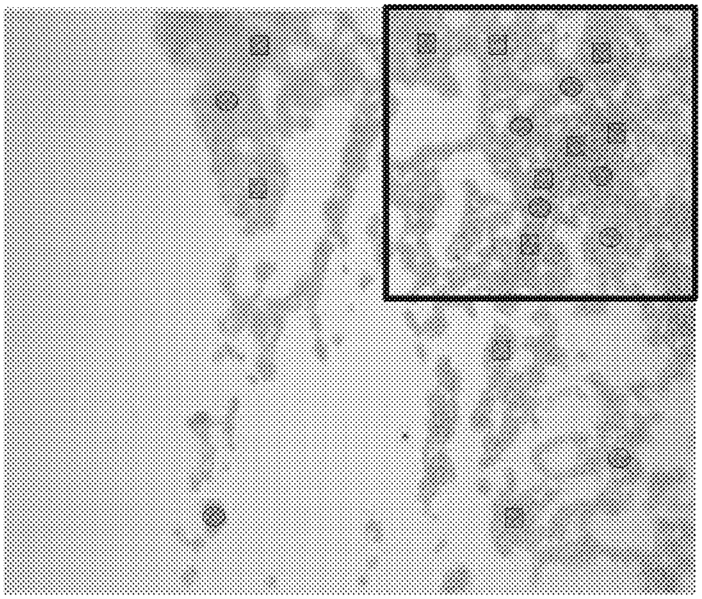
FIG. 4 is a schematic diagram showing the photographing result of the first lens, wherein the system will select the top-right region (square frame), which includes denser cells, as the photographing target of the second lens.

FIG. 4 shows the original sample image photographed by the first lens 21. The processing unit 60 as shown in FIG. 1 can compare this original sample image with the images in the database so as to determine the top-right region (square frame) of the sample image, which includes denser suspected abnormal cells (represented by square dots and circle dots), as the photographing position of the second lens 22. Accordingly, the imaging unit 20 will be moved to the square frame for the following photographing with the second lens 22.

Figure 5A:
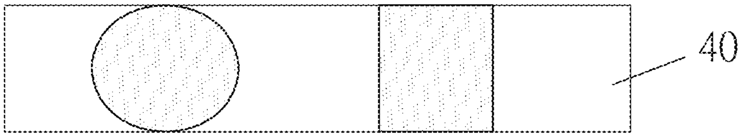
Figure 5B:
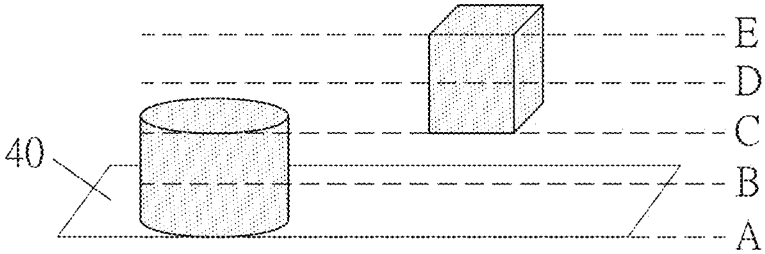

Referring to FIG. 1, FIG. 5A and FIG. 5B, there are two defected cells, including a cylindrical cell and a cuboid cell, in the photographing position selected from to the top-right region of FIG. 4. As shown in FIG. 5A (top view), the two defected cells are located at the left and right sides of the liquid sample respectively. As shown in FIG. 5B (side view), the cylindrical cell and the cuboid cell can have different heights relative to the microscope slide 40, so the clear cylindrical cell and the clear cuboid cell cannot be observed simultaneously under the second lens 22. The cylindrical cell is located between the height A and the height C above the upper surface of the microscope slide 40, and the cuboid cell is located between the height C and the height E above the upper surface of the microscope slide 40. After the imaging unit 20 focuses on the upper surface of the slide 40 (i.e., height A) with the distance measuring unit 25 and photographs the liquid sample. Afterwards, the imaging unit 20 is moved a distance (e.g. 3 μm) for four times and photographs the liquid sample after each movement, thereby obtaining five sample images in total. In this case, the imaging unit 20 can focus on five points from the height A to the height E. Herein, from the five sample images, there will be at least one sample image containing the clear cylindrical cell (e.g. the third sample image) and at least one sample image containing the clear cuboid cell (e.g. the fifth sample image).

Furthermore, the processing unit 60 can receive the five sample images, and then integrate the five sample images into one integrated image data. That is, the integrated image data can contain both of the clear cylindrical cell and the clear cuboid cell.

The exemplary embodiments disclosed above are merely intended to illustrate the various utilities of this disclosure. It is understood that numerous modifications, variations and combinations of functional elements and features of the present disclosure are possible in light of the above teachings and, therefore, within the scope of the appended claims, the present disclosure may be practiced otherwise than as particularly disclosed and the principles of this disclosure can be extended easily with appropriate modifications to other applications.

All patents and publications are herein incorporated for reference to the same extent as if each individual publication was specifically and individually indicated to be incorporated by reference. It should be understood that although the present disclosure has been specifically disclosed by preferred embodiments and optional features, modification and variation of the concepts herein disclosed may be resorted by those skilled in the art, and that such modifications and variations are considered to be within the scope of this disclosure.

What is claimed is:

1. An imaging system, comprising:

a carrier stage for carrying an object to be sampled;

an imaging unit disposed with respect to the carrier stage; and a first controller electrically connected to the imaging unit, wherein the first controller is configured to move the imaging unit for multiple times in a first direction perpendicular to the carrier stage, wherein the imaging unit is moved a first distance in each movement, and wherein the imaging unit is configured to photograph the object after each movement to obtain a plurality of sample images.

2. The imaging system of claim 1, further comprising a processing unit configured for receiving the plurality of sample images and integrating the plurality of sample images into one integrated image data.

3. The imaging system of claim 1, further comprising a distance measuring unit configured for measuring a distance between the imaging unit and the carrier stage.

4. The imaging system of claim 3, wherein the distance measuring unit is a laser focusing device.

5. The imaging system of claim 1, further comprising a positioning mechanism arranged on the carrier stage for fixing the object.

6. The imaging system of claim 1, wherein the imaging unit comprises a first lens and a second lens, the first lens has a first magnification, the second lens has a second magnification, the imaging unit is configured to obtain a preview image with the first lens and to obtain the plurality of sample images with the second lens, and the first magnification is smaller than the second magnification.

7. The imaging system of claim 1, wherein the first distance is in a range from 1 μm to about 5 μm.

8. An imaging method, which is applied to an imaging system for photographing an object to be sampled, the imaging system comprising a carrier stage, an imaging unit and a first controller, the carrier stage carrying the object to be sampled, the imaging unit disposed with respect to the carrier stage, the first controller electrically connected to the imaging unit, the imaging method comprising steps of:

fixing the object on the carrier stage;

moving the carrier stage to a first photographing position;

moving the imaging unit, controlled by the first controller, for multiple times in a first direction, wherein the imaging unit is moved a first distance in each movement, and the first direction is perpendicular to the carrier stage; and the imaging unit photographing the object after each movement to obtain a plurality of sample images.

9. The imaging method of claim 8, wherein the imaging system further comprises a processing unit, and the imaging method further comprises a step of: the processing unit receiving the plurality of sample images and integrating the plurality of sample images into one integrated image data.

10. The imaging method of claim 8, wherein the imaging system further comprises a distance measuring unit, and the imaging method further comprises a step of: the distance measuring unit measuring a distance between the imaging unit and the carrier stage.

11. The imaging method of claim 8, further comprising, before moving the carrier stage to the first photographing position, a step of: moving the carrier stage to a preview position, and the imaging unit photographing the object to obtain a preview image.

12. The imaging method of claim 11, wherein the imaging system further comprises a processing unit, and the imaging method further comprises a step of: the processing unit receiving the preview image and determining the first photographing position.

13. The imaging method of claim 12, wherein the processing unit compares the preview image with a built-in database to determine the first photographing position.

14. The imaging method of claim 11, wherein the preview image includes a whole-area image of the object or a partial-area image of the object.

15. The imaging method of claim 11, wherein the imaging unit further comprises a first lens and a second lens, the first lens has a first magnification, the second lens has a second magnification, and the first magnification is not equal to the second magnification, wherein the imaging method further comprises a step of: the imaging unit obtaining the preview image with the first lens and obtaining the plurality of sample images with the second lens.

16. The imaging method of claim 15, wherein the first magnification is less-smaller than the second magnification.

17. The imaging method of claim 16, further comprising: comparing the preview image with a database, determining a region by the comparison, and photographing the determined region with the second lens to obtain the plurality of sample images.

18. The imaging method of claim 8, wherein the object is a liquid sample.

* * * * *